(12) United States Patent
Liang

(10) Patent No.: US 9,340,221 B1
(45) Date of Patent: May 17, 2016

(54) HAND TRUCK

(71) Applicant: Joseph Liang, Ping-Tung Hsien (TW)

(72) Inventor: Joseph Liang, Ping-Tung Hsien (TW)

(73) Assignee: Parkson Liang, Closter, NJ (US)

( * ) Notice: Subject to any disclaimer, the term of this patent is extended or adjusted under 35 U.S.C. 154(b) by 0 days.

(21) Appl. No.: 14/525,860

(22) Filed: Oct. 28, 2014

(51) Int. Cl.
*B62B 1/12* (2006.01)
*B62B 1/14* (2006.01)

(52) U.S. Cl.
CPC ... *B62B 1/12* (2013.01); *B62B 1/14* (2013.01); *B62B 2202/24* (2013.01); *B62B 2203/20* (2013.01)

(58) Field of Classification Search
CPC .............. B62B 1/00; B62B 1/02; B62B 1/04; B62B 1/042; B62B 1/06; B62B 1/10; B62B 1/12; B62B 1/14; B62B 1/142; B62B 1/26; B62B 1/266; B62B 2202/12; B62B 2202/24; B62B 2202/26; B62B 2203/20
USPC ............................................ 280/47.28, 47.29
See application file for complete search history.

(56) References Cited

U.S. PATENT DOCUMENTS

| 522,202 | A | * | 7/1894 | Frenette | B62B 1/14 280/47.28 |
| 1,099,584 | A | * | 6/1914 | Wedge | B62B 1/14 280/47.28 |
| 1,653,927 | A | * | 12/1927 | Pryor | B62B 1/14 280/47.29 |
| 2,700,573 | A | * | 1/1955 | Nordgard | B62B 1/12 280/47.27 |
| 3,079,168 | A | * | 2/1963 | Monroe | B62B 1/12 280/47.28 |
| 5,465,987 | A | * | 11/1995 | DellaVecchia | B62B 1/14 280/47.18 |
| 7,617,956 | B1 | * | 11/2009 | Sabbah | A45C 5/143 190/18 A |
| 2003/0038008 | A1 | * | 2/2003 | Han | A45C 3/00 190/115 |
| 2006/0244242 | A1 | * | 11/2006 | Woo | A45C 5/143 280/651 |
| 2010/0001030 | A1 | * | 1/2010 | Sun | A45C 3/04 224/539 |

\* cited by examiner

*Primary Examiner* — Frank Vanaman
(74) *Attorney, Agent, or Firm* — Trop Pruner & Hu, P.C.

(57) ABSTRACT

A hand truck includes a support base, a plurality of wheels connected rotatably to the support base, a handle unit connected to the support base, and a fork unit. The support base has a pair of holding portions and a recess portion disposed between the holding portions. The fork unit has a pivoting portion connected pivotally to the support base, an inserting portion opposite to the pivoting portion, and a connecting portion interconnecting the pivoting portion and the inserting portion. The fork unit is pivotable between a retracted position, where the inserting portion and the connecting portion are adjacent to the support base, and a projected position, where the inserting portion and the connecting portion are away from the support base.

10 Claims, 11 Drawing Sheets ated pivotally and respectively to opposite sides of the sliding member 13, a pair of holding arms 15 pivotally and respectively connected to lower ends of the supporting legs 14, a securing rope 16 having opposite ends that are respectively connected to two distal ends of the holding arms 15 and that is provided with a hook member 161, and a ring 17 disposed fixedly on the telescopic arm 12 and above the hollow surrounding member 11.

In use, after unfolding the holding arms 15 from the supporting legs 14, the supporting legs 14 are spread out through downward sliding movement of the sliding member 13. A container (not shown) can then be placed on the holding arms 15, and the securing rope 16 is stretched over the container to hook the hook member 161 onto the ring 17 to secure the container on the hand truck 1. However, merely using the securing rope 16 to secure the container may not be sufficient since the container may shake during transportation of the hand truck 1.

Referring to FIG. 3, another conventional hand truck 2 includes a handle unit 21, a supporting member 22 connected proximate to a top end of the handle unit 21, a first holding member 23 connected to a bottom end of the handle unit 21, a second holding member 24 detachably connected to the first holding member 23, a bag 25, and a plurality of engaging members 26 fixed to top and bottom of the bag 25.

The bag 25 can be fixed between the supporting member 22 and the first and second holding members 23, 24 using, for example, screws 27. However, the fastening and unfastening processes of the bag 25 are relatively troublesome.

SUMMARY OF THE INVENTION

Therefore, the object of the present invention is to provide a hand truck that can eliminate the drawbacks associated with the abovementioned prior arts.

Accordingly, a hand truck of the present invention may include a support base, a plurality of wheels connected rotatably to the support base, a handle unit connected to the support base, and a fork unit. The support base may have a pair of spaced-apart holding portions and a recess portion disposed between the holding portions. The fork unit may have a pivoting portion connected pivotally to the support base, an inserting portion opposite to the pivoting portion, and a connecting portion interconnecting the pivoting portion and the inserting portion. The fork unit may be pivotable relative to the support base between a retracted position, where the inserting portion and the connecting port ion are adjacent to the support base, and a projected position, where the inserting portion and the connecting portion are away from the support base.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
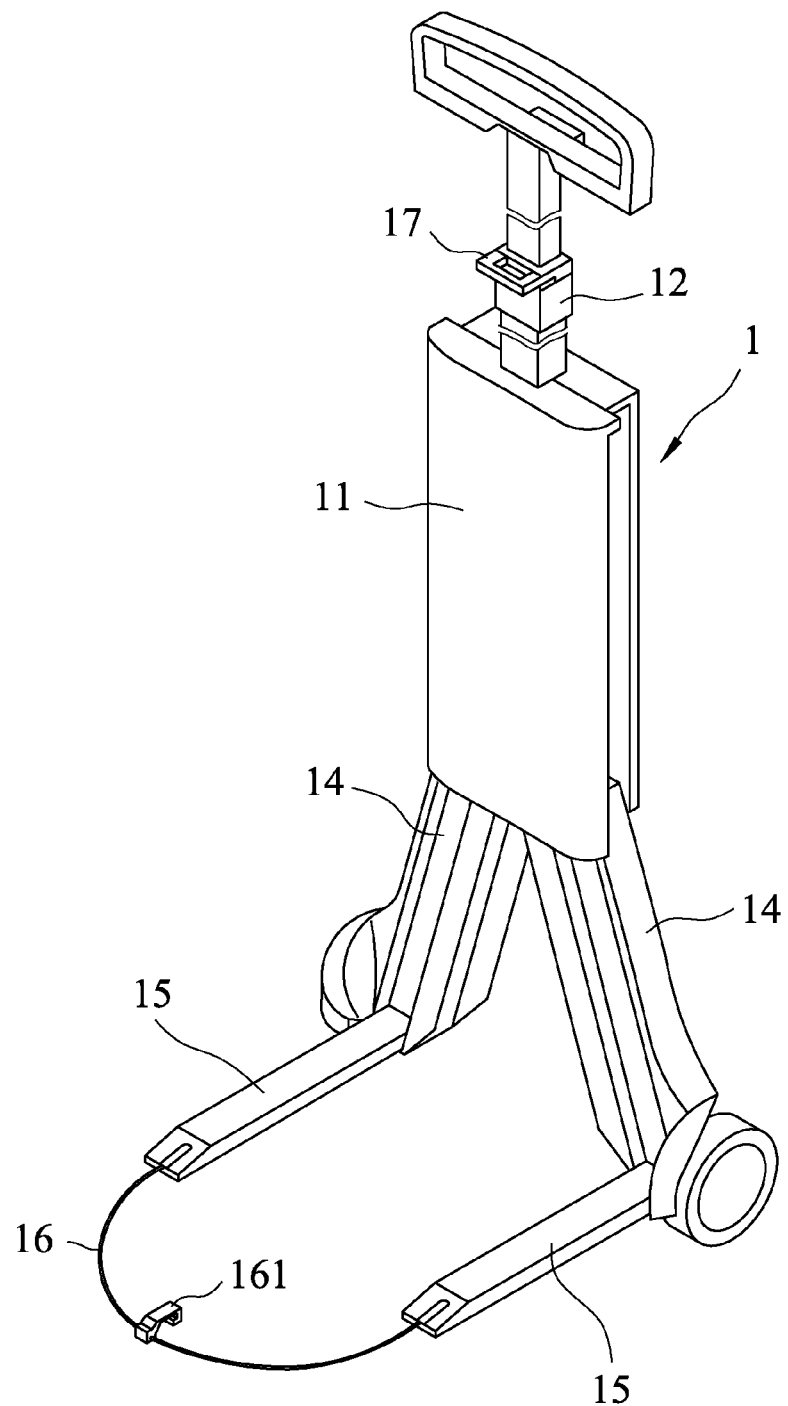
FIG. 1 is a perspective view of a conventional hand truck.
Figure 2:
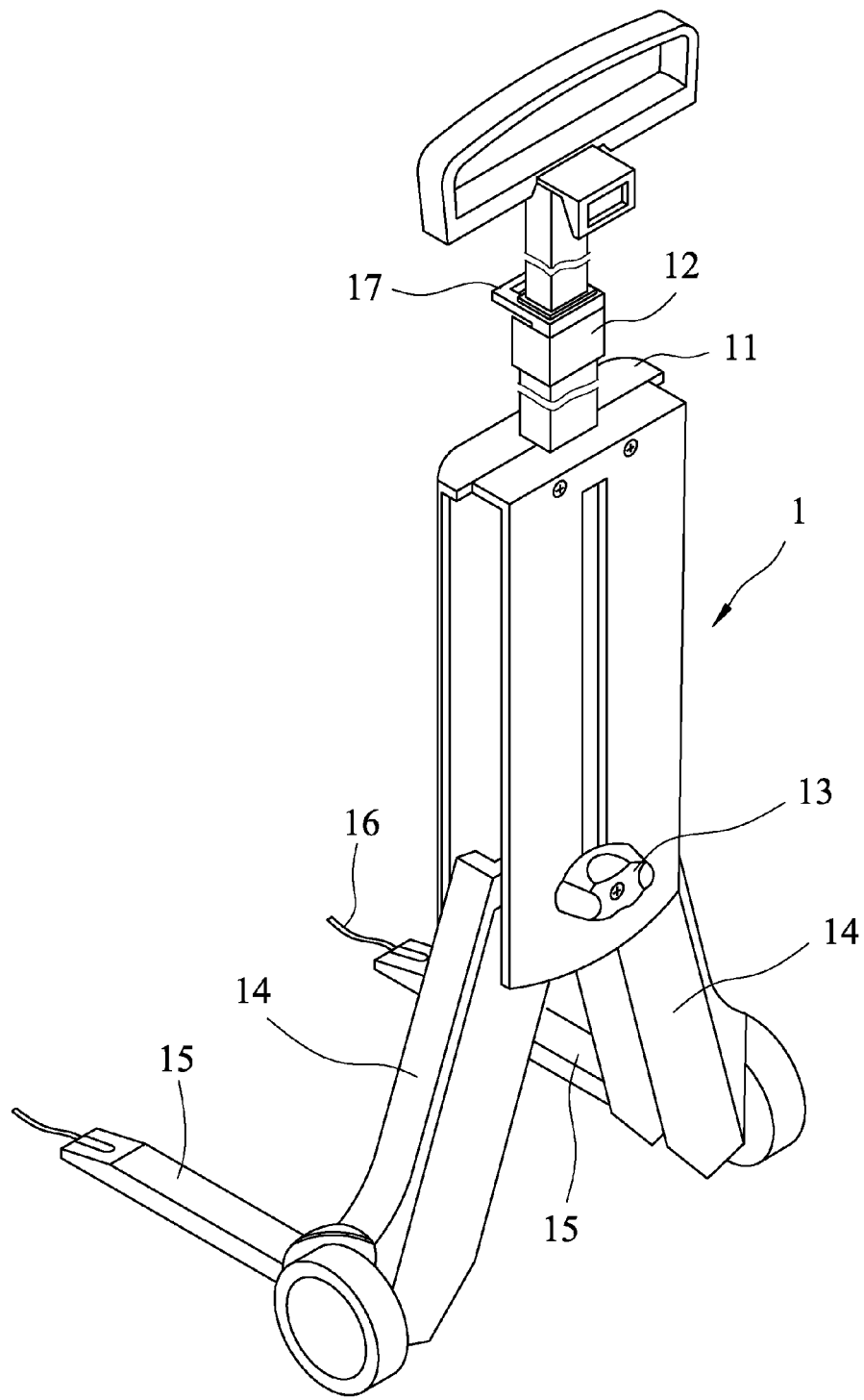
FIG. 2 is a fragmentary perspective view of the conventional hand truck.
Figure 3:
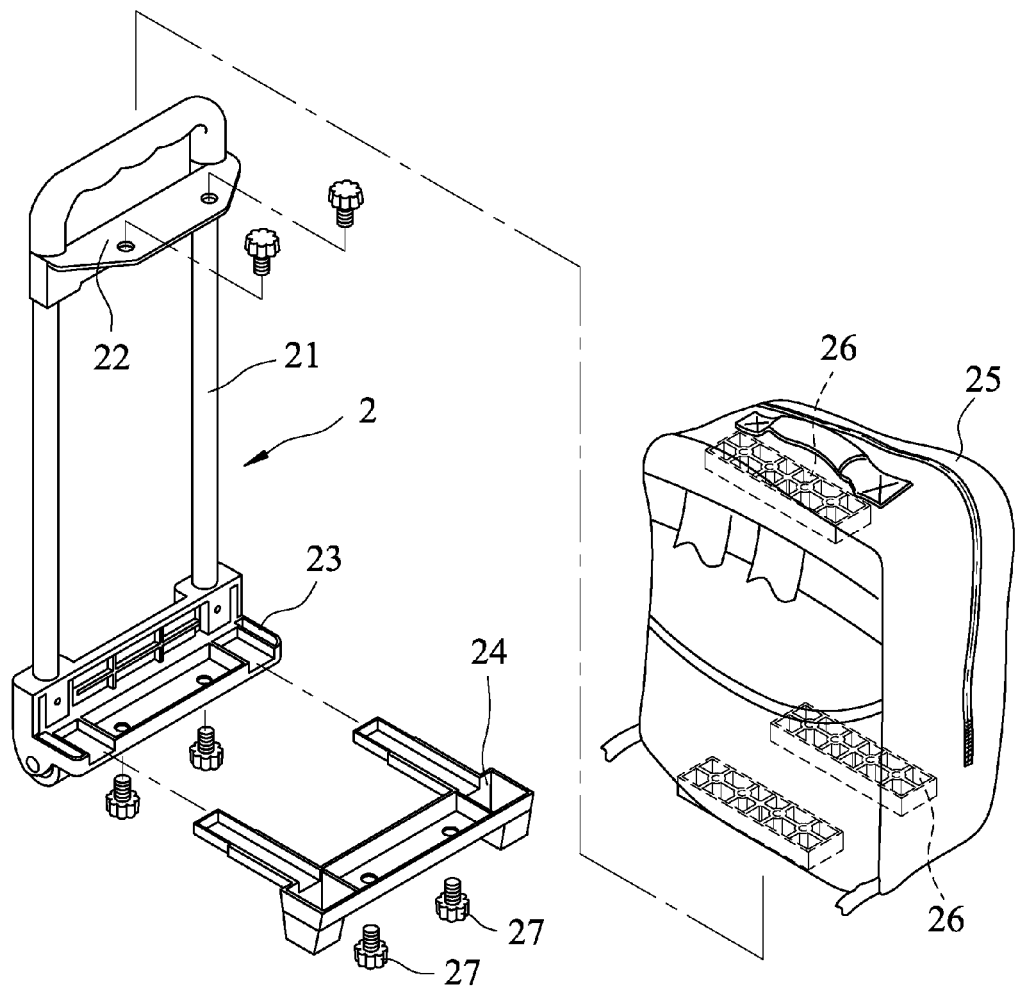
FIG. 3 is a fragmentary, exploded perspective view of another conventional hand truck.
Figure 4:
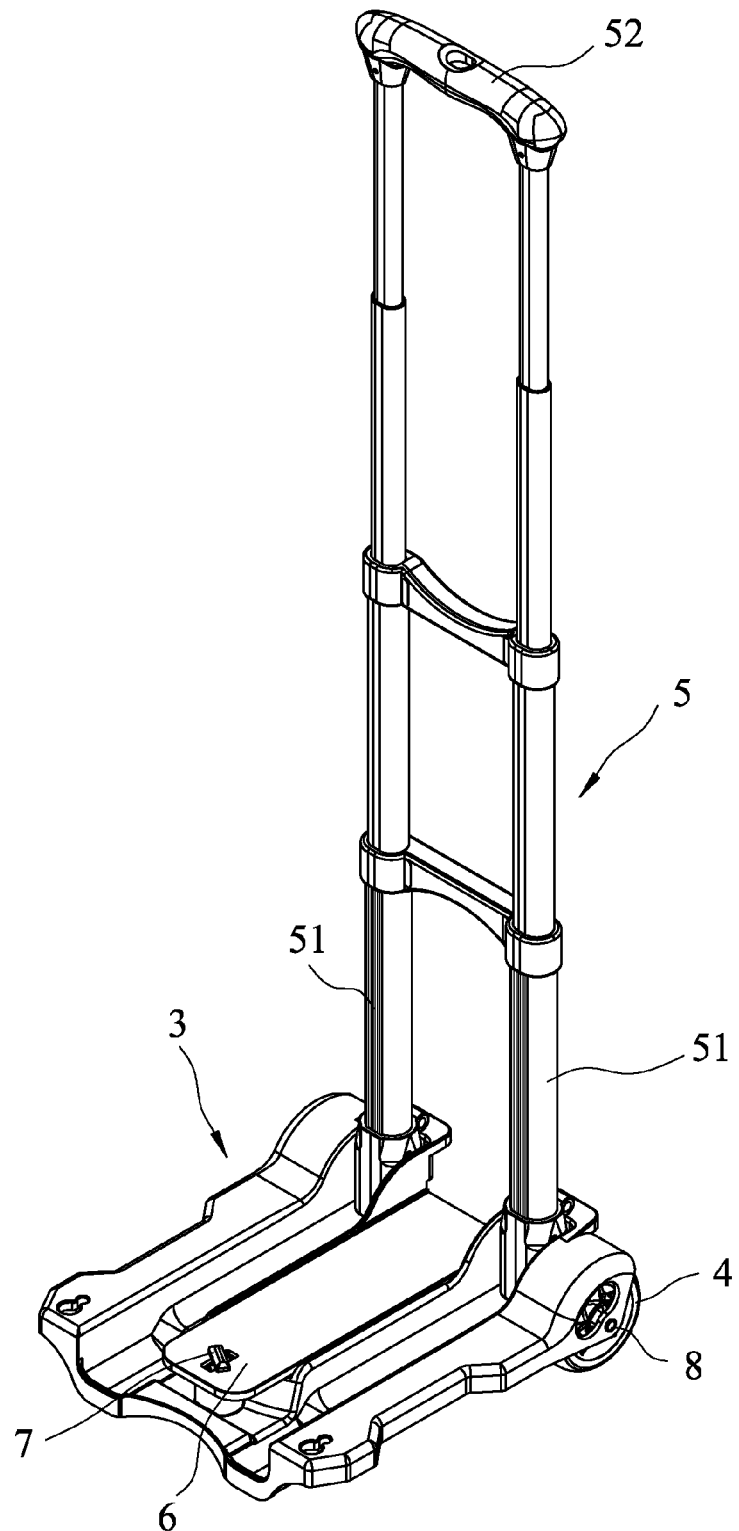
FIG. 4 is a fragmentary perspective view of an embodiment of a hand truck according to the present invention.
Figure 5:
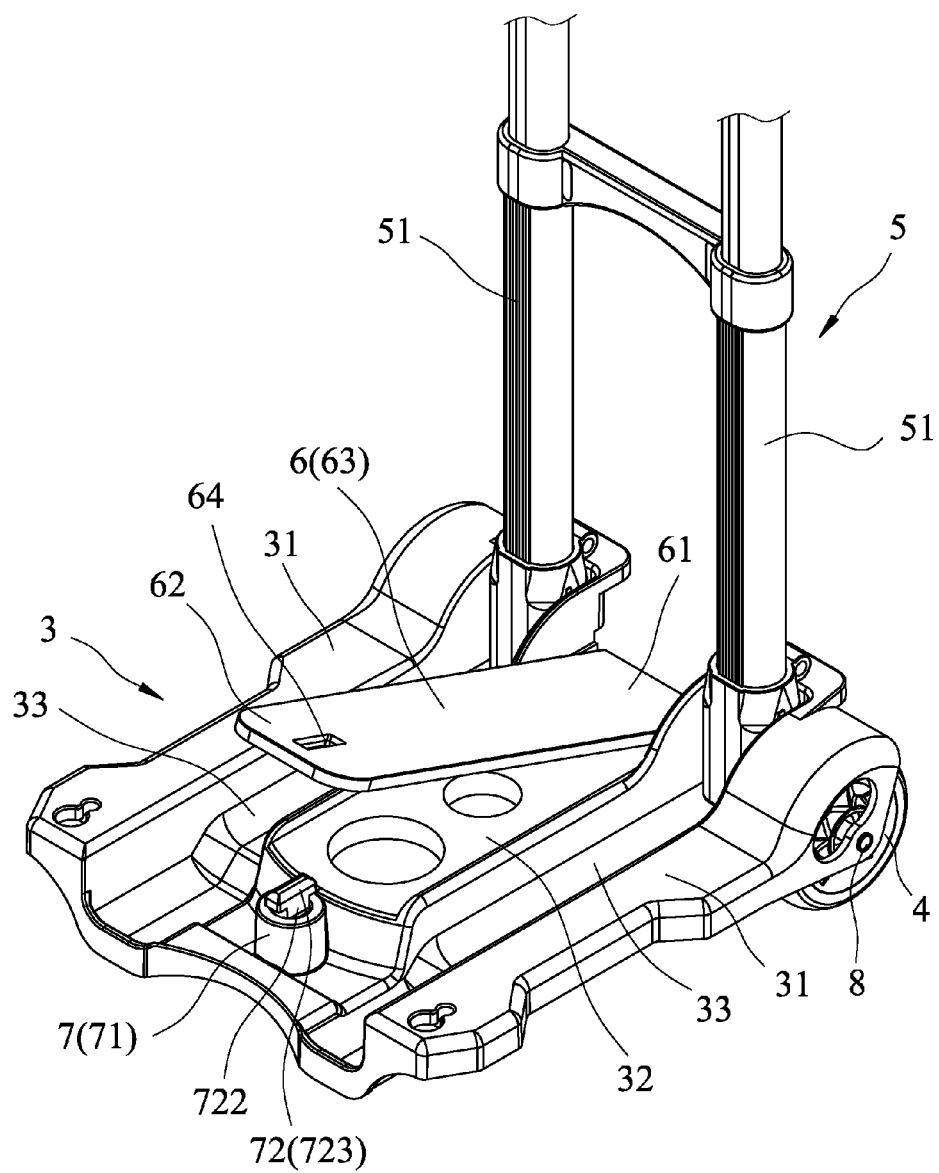
FIG. 5 is a fragmentary perspective view of the embodiment illustrating a fork unit at a projected position and a locking member of a locking unit at an unlocking state.
Figure 6:
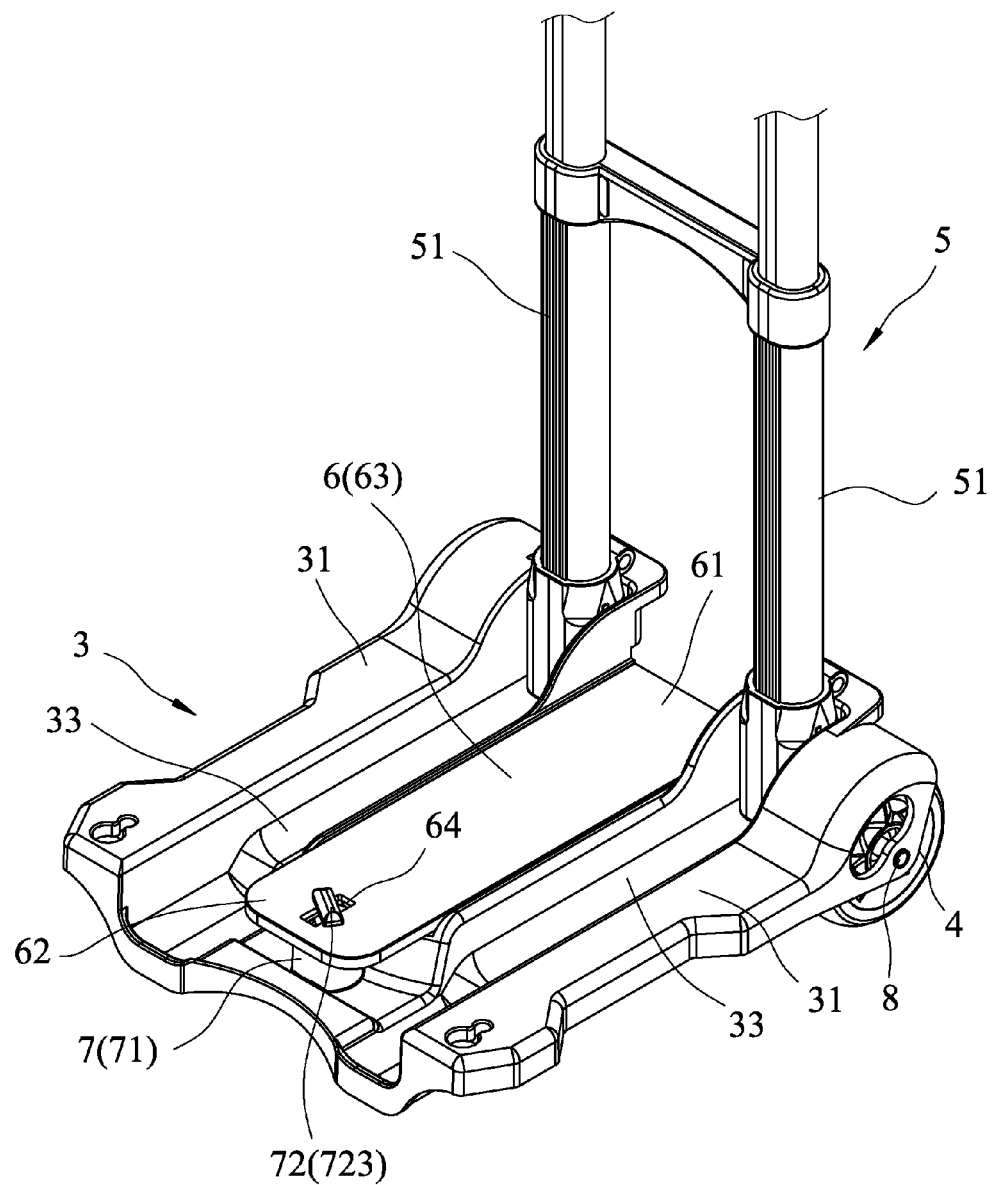
FIG. 6 is a view similar to FIG. 5, but illustrating the fork unit at a retracted position and the locking member at a locking state.
Figure 7:
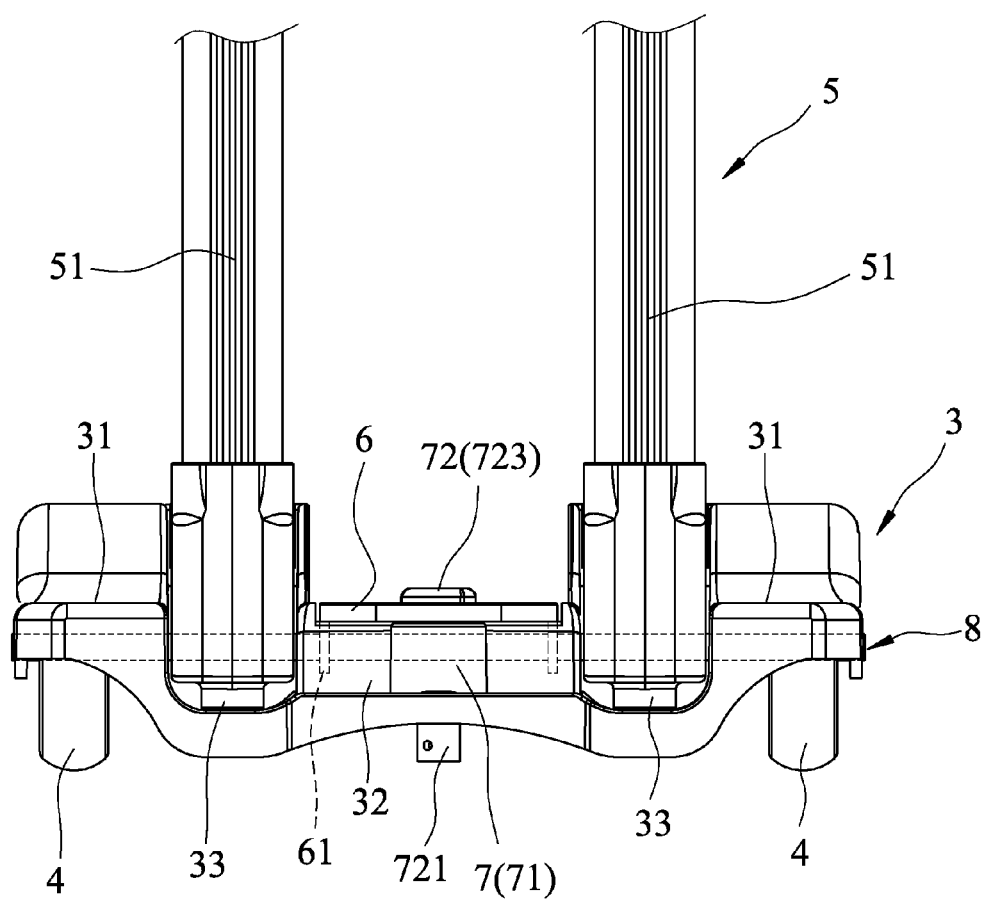
FIG. 7 is a fragmentary front view of the embodiment.

Referring to FIGS. 4 to 7, an embodiment of a hand truck according to the present invention includes a support base 3, a pair of wheels 4 connected rotatably to opposite lateral sides of the support base 3, a handle unit 5 connected to a rear end of the support base 3, a fork unit 6, a locking unit 7 and a rotation shaft 8.

The support base 3 has a pair of holding portions 31 that are respectively disposed at left and right sides thereof, a recess portion 32 that is disposed between the holding portions 31, and a pair of retaining portions 33 that are respectively disposed at opposite left and right sides of the recess portion 32 and that are disposed between the holding portions 31.

The handle unit 5 includes a pair of spaced-apart telescopic arms 51, and a handle member 52 (see FIG. 4) interconnecting upper ends of the telescopic arms 51. The telescopic arms 51 are connected to the support base 3, and are pivotable to be respectively received in the retaining portions 33 when being fully retracted.

The fork unit 6 has a pivoting portion 61 that is connected pivotally to a rear end of the recess portion 32 of the support base 3, an inserting portion 62 opposite to the pivoting portion 61, a connecting portion 63 interconnecting the pivoting portion 61 and the inserting portion 62, and a securing member 64 disposed at the inserting portion 62. The fork unit 6 is pivotable relative to the support base 3 between a retracted position (see FIGS. 4 and 6), where the inserting portion 62 and the connecting portion 63 are adjacent to the support base 3, and a projected position (see FIG. 5), where the inserting portion 62 and the connecting portion 63 are away from the support base 3. The connecting portion 63 is received in the recess portion 32 when the fork unit 6 is at the retracted position, such that a top end of the connecting portion 63 is not higher than that of the holding portions 31. In this embodiment, the securing member 64 is configured as a through hole.

The locking unit 7 is mounted to the recess portion 32 of the base portion 3, and includes a locking member 72 that is convertible between a locking state (see FIG. 6), where the locking member 72 engages the securing member 64 to lock the fork unit 6 when the fork unit 6 is at the retracted position, and an unlocking state (see FIG. 5), where the locking member 72 is disengaged from the securing member 64 to permit pivotal movement of the fork unit 6 relative to the support base 3. The locking unit 7 further includes a sleeve 71 mounted to the recess portion 32 of the base portion 3. Specifically, the locking member 72 has a shaft portion 721 (see FIG. 7) that extends rotatably through the sleeve 71, a neck portion 722 that is connected to a top end of the shaft portion 721, and a knob portion 723 that is connected to the neck portion 722 and that has a cross-section larger than that of the neck portion 722. The neck portion 722 extends through the securing member 64 with the knob portion 723 and the shaft portion 721 being disposed at opposite sides of the fork unit 6 when the fork unit 6 is at the retracted position, so that the knob portion 723 is rotatable to move the locking member 72 between the locking state and the unlocking state.

The rotation shaft 8 is rotatably received in the rear end of the support base 3 such that the wheels 4 are rotatably connected to the rotation shaft 8, and that the telescopic arms 51 of the handle unit 5 and the pivoting portion 61 of the fork unit 6 are pivotally connected to the rotation shaft 8.

Figure 8:
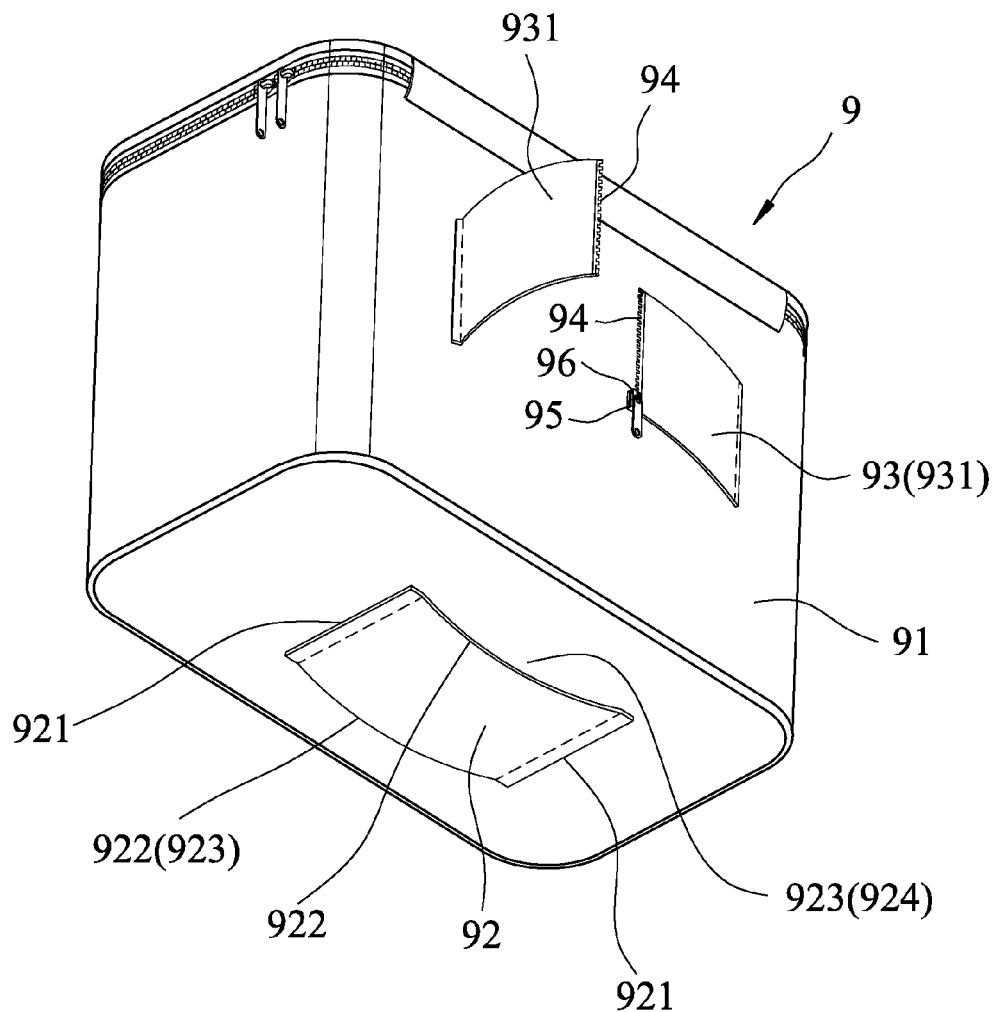
FIG. 8 is a perspective view of a container unit of the embodiment.

Referring to FIG. 8, the hand truck further includes a container unit 9. The container unit 9 includes a container 91, a first securing strip 92 and a second securing strip 93. The container 91 has opposite upper and lower surfaces.

The first securing strip 92 has opposite fixing ends 921 and opposite connecting ends 922 interconnecting the fixing ends 921. The fixing ends 921 are connected fixedly to the lower surface of the container 91 so as to position the first securing strip 92 at the center of the lower surface of the container 91. The first securing strip 92 cooperates with the lower surface of the container 91 to define a receiving space 924 therebetween. Each of the connecting ends 922 cooperates with the lower surface of the container 91 to define an opening 923 that is in spatial communication with the receiving space 924 and that has a width greater than that of the fork unit 6.

The second securing strip 93 is connected to a lateral surface of the container 91. The second securing strip 93 includes a pair of body portions 931, each of which has an outer end that is connected fixedly to the lateral surface of the container 91, and an inner end opposite to the outer end. The inner end of one of the body portions 931 is separably connected to the inner end of the other one of the body portions 931 such that the second securing strip 93 cooperates with the lateral surface of the container 91 to restrain the handle unit 5 therebetween (see FIG. 11).

The container unit 9 further includes a pair of connector members 94, a retainer box 95 and a slider 96. Each of the connector members 94 is disposed on the inner end of a respective one of the body portions 931. The retainer box 95 is disposed at a bottom end of the inner end of one of the body portions 931 for receiving a bottom end of the inner end of the other one of the body portions 931. The slider 96 is disposed on the inner end of the one of the body portions 931 and is slidable along the inner end of the one of the body portions 931 for connecting and disconnecting the inner end of the one of the body portions 931 to and from the inner end of the other one of the body portions 931.

Figure 9:
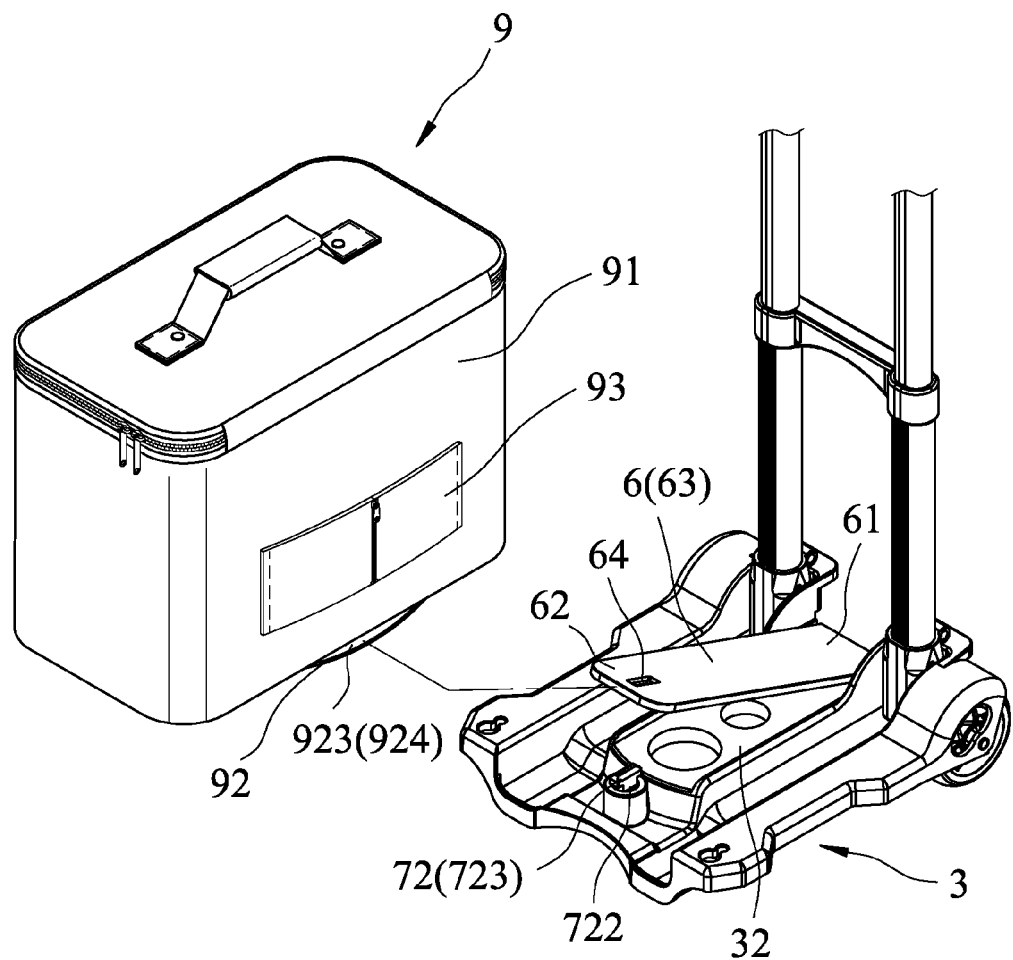
FIG. 9 is a fragmentary, partly exploded perspective view of the embodiment.
Figure 10:
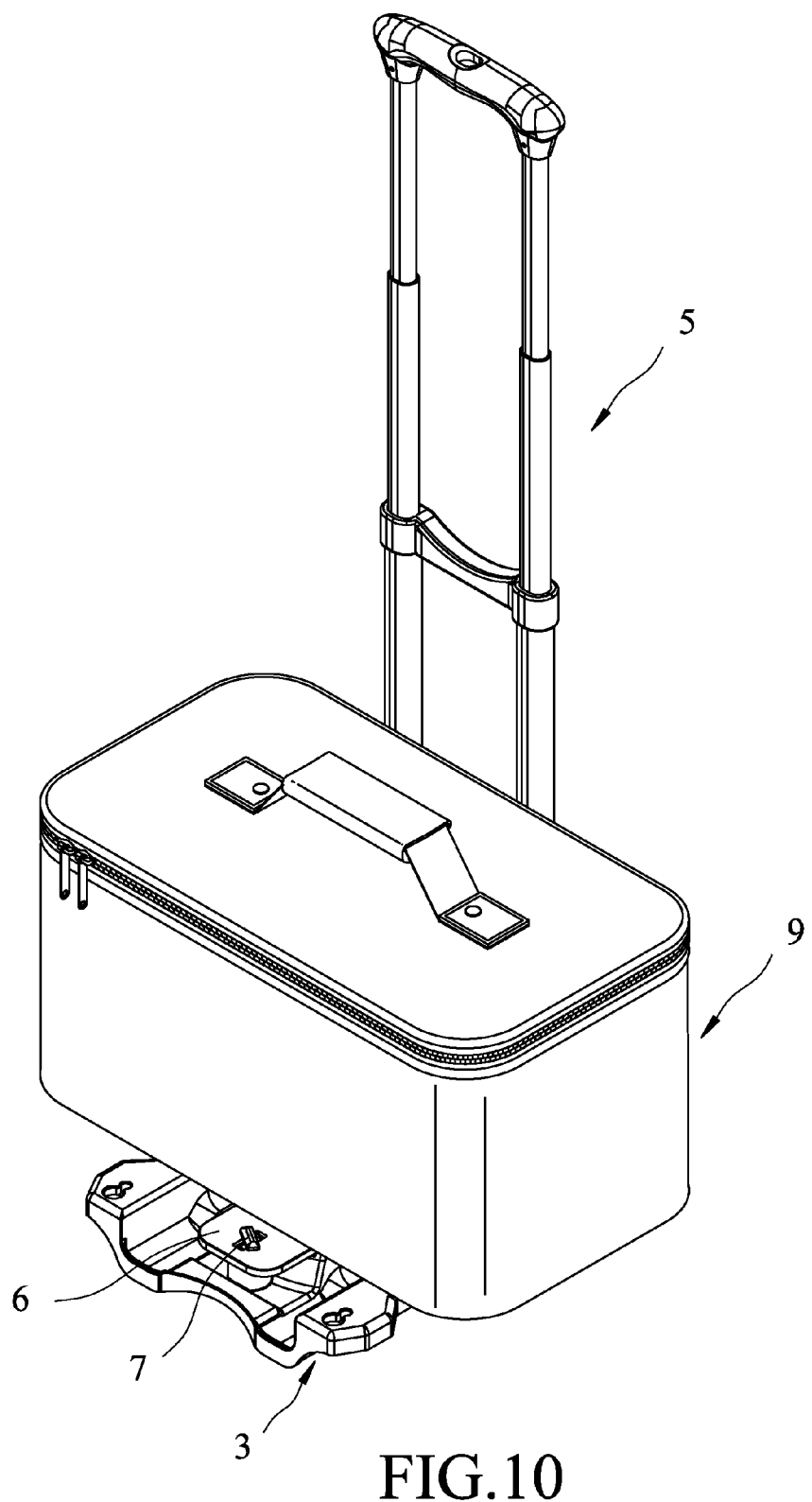
FIG. 10 is an assembled perspective view of the embodiment.
Figure 11:
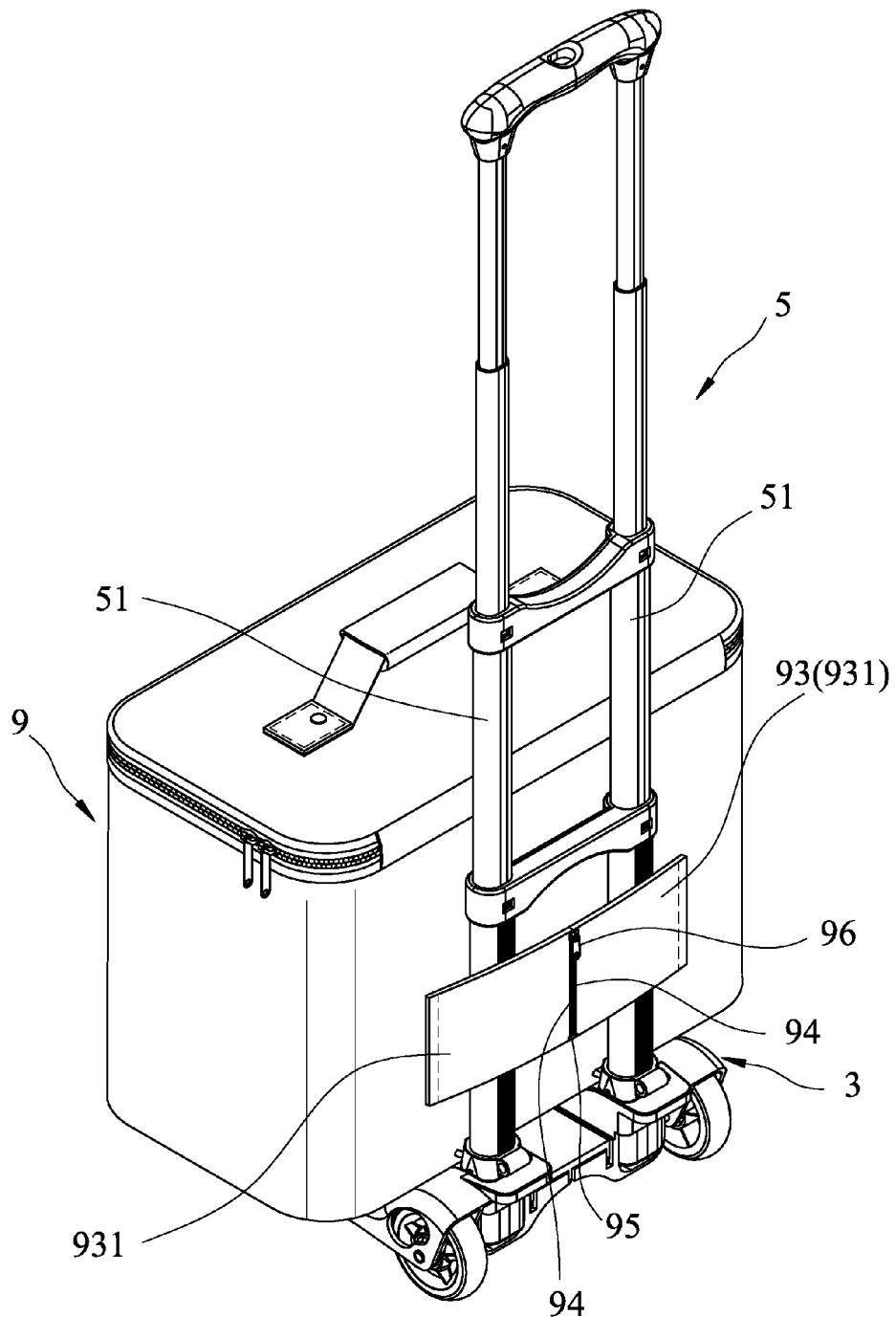
FIG. 11 is another assembled perspective view of the embodiment.

Referring further to FIGS. 9 to 11, in a process of securing the container unit 9 to the hand truck when the fork unit 6 is at the retracted position, it is first ensured that the locking member 72 is in the unlocking state. Afterward, the fork unit 6 is lifted to disengage the locking member 72 from the securing member 64 and is moved to the projected position. Then, the inserting portion 62 is inserted into the receiving space 924. Finally, the fork unit 6 is moved downward together with the container unit 9 to the retracted position, and the locking member 72 engages once again the securing member 64 and is rotated to the locking state to lock the fork unit 6 at the retracted position. Therefore, shaking of the container 91 during transportation of the hand truck could be effectively minimized.

Moreover, the second securing strip 93 can be used to further secure the container 91. The body portions 931 of the second securing strip 93 are separated from each other and moved to surround the telescopic arms 51. An end of one of the connector members 94 which is disposed on the other one of the body portions 931 is inserted into the retainer box 95. The slider 96 is moved upward along the inner end of the one of the body portions 931 to connect the one of the connector members 94 to the other one of the connector members 94. Therefore, the telescopic arms 51 of the handle unit 5 are restrained between the second securing strip 93 and the lateral surface of the container 91.

It is worth mentioning that the container 91 may be a rigid luggage case or a soft bag. The types of the container 91 should not limit the scope of the present invention.

By using the pivoting fork unit 6 with the first securing strip 92, the container unit 9 could be easily secured to the hand truck. Also, the second securing strip 93 enhances securing of the container unit 9 to the hand truck.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hand truck comprising:
   a support base having a pair of spaced-apart holding portions and a recess portion that is disposed between said holding portions;
   a plurality of wheels connected rotatably to said support base;
   a handle unit connected to said support base; and
   a fork unit having a pivoting portion that is connected pivotally to said support base, an inserting portion that is opposite to said pivoting portion, and a connecting portion that interconnects said pivoting portion and said inserting portion, said fork unit being pivotable relative to said support base between a retracted position, where said inserting portion and said connecting portion are adjacent to said support base, and a projected position, where said inserting portion and said connecting portion are away from said support base;
   wherein said fork unit further has a securing member disposed at said inserting portion; and
   wherein said hand truck further comprises a locking unit that is mounted to said recess portion of said support base, and that includes a locking member, said locking member being convertible between a locking state, where said locking member engages said securing member to lock said fork unit when said fork unit is at the retracted position, and an unlocking state, where said locking member is disengaged from said securing member to permit pivot movement of said fork unit relative to said support base.

2. The hand truck as claimed in claim 1, wherein said locking unit further includes a sleeve, said locking member having a shaft portion that extends rotatably through said sleeve, a neck portion that is connected to a top end of said shaft portion, and a knob portion that is connected to said neck portion and that has a cross-section larger than that of said neck portion, said securing member of said fork unit being configured as a through hole, said neck portion extending through said securing member with said knob portion and said shaft portion being disposed at opposite sides of said fork unit when said fork unit is at the retracted position, so that said knob portion is rotatable to move said locking member between the locking state and the unlocking state.

3. The hand truck as claimed in claim 2, further comprising a container unit that includes a container having upper and lower surfaces, and a first securing strip having opposite fixing ends that are connected fixedly to said lower surface of said container and opposite connecting ends that interconnect said fixing ends, said first securing strip cooperating with said lower surface of said container to define a receiving space therebetween, each of said connecting ends cooperating with said lower surface of said container to define an opening that is in spatial communication with said receiving space and that has a width greater than that of said fork unit.

4. The hand truck as claimed in claim 3, wherein said handle unit is connected to a rear end of said support base, said holding portions of said support base being respectively disposed at left and right sides of said support base, said first securing strip being disposed at a center of said lower surface of said container, said connecting portion of said fork unit being received in said recess portion such that a top end of said connecting portion is not higher than that of said holding portions.

5. The hand truck as claimed in claim 4, wherein said pivoting portion is pivotally connected to a rear end of said recess portion.

6. The hand truck as claimed in claim 5, wherein said container unit further includes a second securing strip connected to a lateral surface of said container, said second securing strip including a pair of body portions, each of which has an outer end that is connected fixedly to said lateral surface of said container, and an inner end opposite to said outer end, said inner end of one of said body portions being separably connected to said inner end of the other one of said body portions such that said second securing strip cooperates with said lateral surface to restrain said handle unit therebetween.

7. The hand truck as claimed in claim 6, wherein said container unit further includes:
  a pair of connector members, each of which is disposed on said inner end of a respective one of said body portions;
  a retainer box disposed at an end of said inner end of one of said body portions for receiving an end of said inner end of the other one of said body portions; and
  a slider disposed on said inner end of the one of said body portions, and being slidable along said inner end of the one of said body portions for connecting and disconnecting said inner end of the one of said body portions to and from said inner end of the other one of said body portions.

8. The hand truck as claimed in claim 6, wherein said handle unit includes a pair of spaced-apart telescopic arms, and a handle member interconnecting upper ends of said telescopic arms, said support base further having a pair of retaining portions that are respectively disposed at opposite sides of said recess portion and that are disposed between said holding portions, said telescopic arms being connected to said support base, and being pivotable to be respectively received in said retaining portions when being fully retracted.

9. The hand truck as claimed in claim 8, further comprising a rotation shaft that is rotatably received in said rear end of said support base such that said wheels are rotatably connected to said rotation shaft, and that said telescopic arms of said handle unit and said pivoting portion of said fork unit are pivotally connected to said rotation shaft.

10. The hand truck as claimed in claim 1, further comprising a container unit that includes a container having upper and lower surfaces, and a first securing strip having opposite fixing ends that are connected fixedly to said lower surface of said container and opposite connecting ends that interconnect said fixing ends, said first securing strip cooperating with said lower surface of said container to define a receiving space therebetween, each of said connecting ends cooperating with said lower surface of said container to define an opening that is in spatial communication with said receiving space and that has a width greater than that of said fork unit.

* * * * *